(12) United States Patent
Obara

(10) Patent No.: US 6,538,354 B2
(45) Date of Patent: *Mar. 25, 2003

(54) SPINDLE MOTOR WITH TOROIDAL SEALING PLATES

(75) Inventor: Rikuro Obara, Nagano-ken (JP)

(73) Assignee: Minebea Kabushiki-Kaisha, Nagano-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,655

(22) Filed: Oct. 19, 1998

(65) Prior Publication Data

US 2002/0047387 A1 Apr. 25, 2002

(30) Foreign Application Priority Data

Oct. 17, 1997 (JP) .................................................. 9-303516

(51) Int. Cl.⁷ .............................. H02K 7/08; H02K 5/10
(52) U.S. Cl. ............................................. 310/90; 310/85
(58) Field of Search ......................... 310/90, 67 R, 310/66, 85; 384/492, 480, 144, 478; 277/303, 412

(56) References Cited

U.S. PATENT DOCUMENTS

| | | | | |
|---|---|---|---|---|
| 4,588,361 A | * | 5/1986 | Saulgeot | 417/423.4 |
| 5,029,876 A | * | 7/1991 | Orlando et al. | 277/56 |
| 5,128,571 A | * | 7/1992 | Itsu | 310/67 R |
| 5,227,686 A | * | 7/1993 | Ogawa | 310/90 |
| 5,347,189 A | * | 9/1994 | Chuta et al. | 310/90 |
| 5,596,235 A | * | 1/1997 | Yazaki et al. | 310/67 R |
| 5,639,168 A | * | 6/1997 | Noguchi et al. | 384/492 |
| 5,841,607 A | * | 11/1998 | Khan et al. | 360/99.08 |
| 6,052,257 A | * | 4/2000 | Branger et al. | 360/99.08 |
| RE37,058 E | * | 2/2001 | Elsasser et al. | 360/98.07 |

* cited by examiner

Primary Examiner—Nestor Ramirez
Assistant Examiner—Guillermo Perez
(74) Attorney, Agent, or Firm—Israel Gopstein

(57) ABSTRACT

A plurality of toroidal sealing plates 16a, 16b, and 16c spaced axially by slight gaps $S_1$ and $S_2$ are disposed between spindle 3 and vertical bore 6 of the rotor hub at above and/or below the bearing apparatus such that the outer or inner peripheral portion of each plate is secured to the inner peripheral portion of the bore of the rotor hub or the outer peripheral portion of the spindle so as to leave slight radial gaps $\alpha_1$, $\alpha_2$ and $\alpha_3$ between the inner or outer peripheral portion of each plate and the outer peripheral portion of the spindle or the inner peripheral portion of the bore of the rotor hub to make each sealing plate uncontacted with the spindle or the bore, wherein the radial gaps are positioned alternately on the side of the spindle or on the side of the bore of the rotor hub.

7 Claims, 9 Drawing Sheets

SPINDLE MOTOR WITH TOROIDAL SEALING PLATES

BACKGROUND OF THE INVENTION

1. Technical Field

The present invention relates in particular to a spindle motor to be used in the hard disk drive means.

2. Description of the Prior Art

The spindle motor of the hard disk drive means employs grease or oil as a lubricant to be applied to the rolling bearing.

The lubricant will be splashed and dispersed during the rotation of the motor in high speed. Thus produced finely dispersed lubricant or oil mist is apt to get into the disk enclosure of the hard disk drive means. Further, fine dusts suspended in atmosphere is tend to get through the bearing assembly into the disk enclosure. These oil mist or dusts will cause the malfunction of the hard disk drive means.

In other words, these oil mist or dust adhered on the magnetic disk or the magnetic head will cause the crushing of the magnetic disk and the magnetic head.

In order to prevent these oil mist or dust from getting into the disk enclosure, a number of countermeasures have been taken by those skilled in the art. Among these countermeasures, a method using a magnetic fluid and that using a labyrinth seal of such structure as shown in FIG. 9 are often employed.

However, when the magnetic fluid is employed to seal, the magnetic fluid filling the gab between the shaft or spindle and a magnetic fluid bearing plate is tend to shift radially outwardly under the effect of centrifugal force. Further, the magnetic fluid sometimes splashes under the effect of locally effected differential of air pressure.

In an example of a labyrinth seal illustrated in FIG. 9, recessed pockets IIIa and IIIb are formed on the opposite surfaces of a hub I (a rotational member) and a base II (a stational member). In the structure of the labyrinth seal of FIG. 9, the cost for machining and molding parts of the motor is relatively high.

Accordingly, the object of the present invention is to provide a spindle motor having a sealing means which can easily be assembled into the motor, a sufficient sealing effect can be obtained thereby, and the cost for machining and molding parts of the sealing means can be reduced.

SUMMARY OF THE INVENTION

These and other objects are achieved by a spindle motor including a base to which a spindle is secured to extend therefrom, a rotor hub through the central portion of which a vertical bore is provided, and a bearing assembly interposed between the spindle and the bore of the rotor hub, characterized in that a plurality of toroidal sealing plates spaced axially by a slight gaps s1 and s2 are disposed between the spindle and the vertical bore of the rotor hub at above and/or below the bearing apparatus such that the outer or inner peripheral portion of each plate is secured to the inner peripheral portion of the bore of the rotor hub or the outer peripheral portion of the spindle so as to leave a slight radial gaps between the inner or outer peripheral portion of each plate and the outer peripheral portion of the spindle or the inner peripheral portion of the bore of the rotor hub to make each sealing plate uncontacted with the spindle or the bore, wherein the radial gaps are positioned alternately on the side of the spindle or on the side of the bore of the rotor hub.

Alternatively, a spindle motor including a base to which a spindle is secured to extend therefrom, a rotor hub through the central portion of which a vertical bore is provided, and a bearing assembly interposed between the spindle and the bore of the rotor hub, characterized in that a plurality of toroidal sealing plates spaced axially by a slight gaps s1 and s2 are disposed between the spindle and the vertical bore of the rotor hub at above and/or below the bearing apparatus such that the outer or inner peripheral portion of each plate is secured to the inner peripheral portion of the bore of the rotor hub or the outer peripheral portion of the spindle so as to leave a slight radial gaps between the inner or outer peripheral portion of each plate and the outer peripheral portion of the spindle or the inner peripheral portion of the bore of the rotor hub to make each sealing plate uncontacted with the spindle or the bore, wherein the radial gaps are positioned alternately on the side of the spindle or on the side of the bore of the rotor hub, and that a toroidal magnetic field generator is secured in its outer peripheral portion to the vertical bore of the rotor hub, and a magnetic fluid is sustained within a radial gap left between the inner periphery of the generator and the outer peripheral surface of the spindle under the effect of the magnetic force of the generator.

BRIEF DESCRIPTION OF THE DRAWINGS

Further feature of the present invention will become apparent to those skilled in the art to which the present invention relates from reading the following specification with reference to the accompanying drawings, in which.

Figure 9:
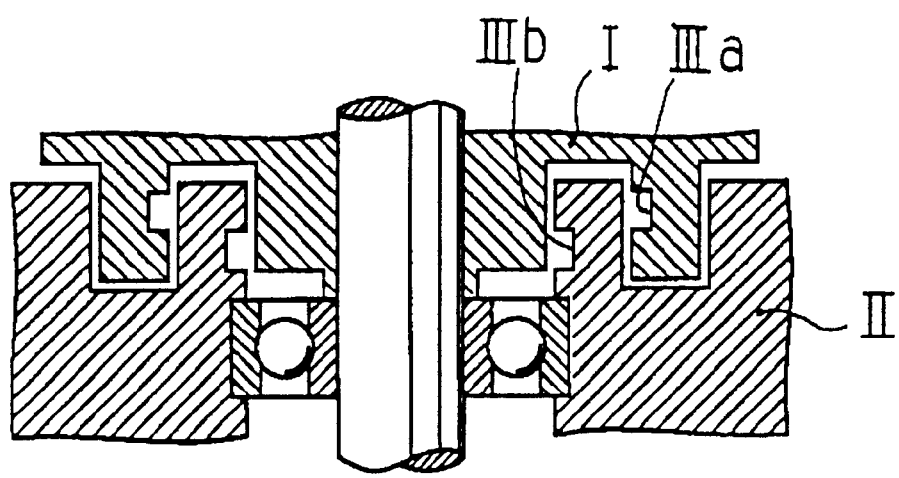

illustrates a longitudinal sectional view, and (b) illustrates a further enlarged sectional view of the important portion of the motor;

FIG. 9 is a longitudinal sectional view showing a labyrinth seal of the prior art.

DETAILED DESCRIPTION OF THE PRESENT INVENTION

<The First Embodiment of the Invention>

Figure 1:
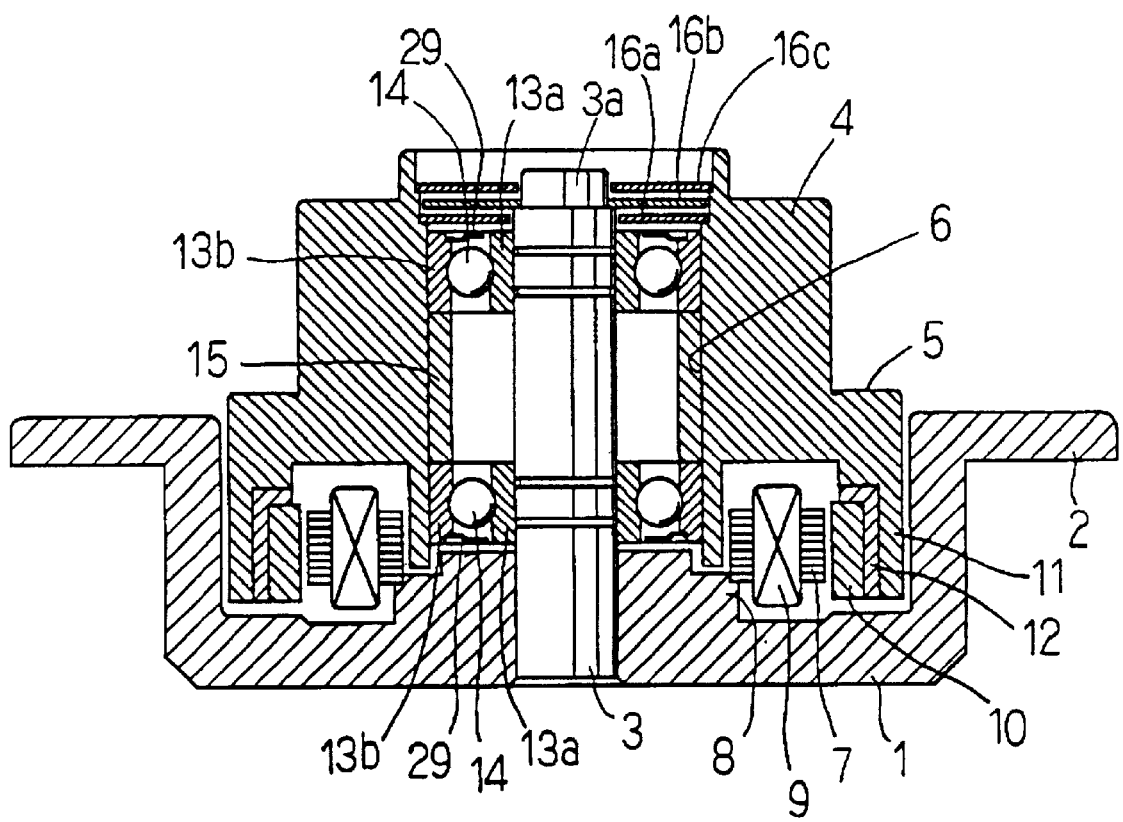
FIG. 1 is an enlarged sectional view showing a motor of the first embodiment of the present invention, in which (a) illustrates a longitudinal sectional view, and (b) illustrates a further enlarged sectional view of the important portion of the motor.
Figure 1:
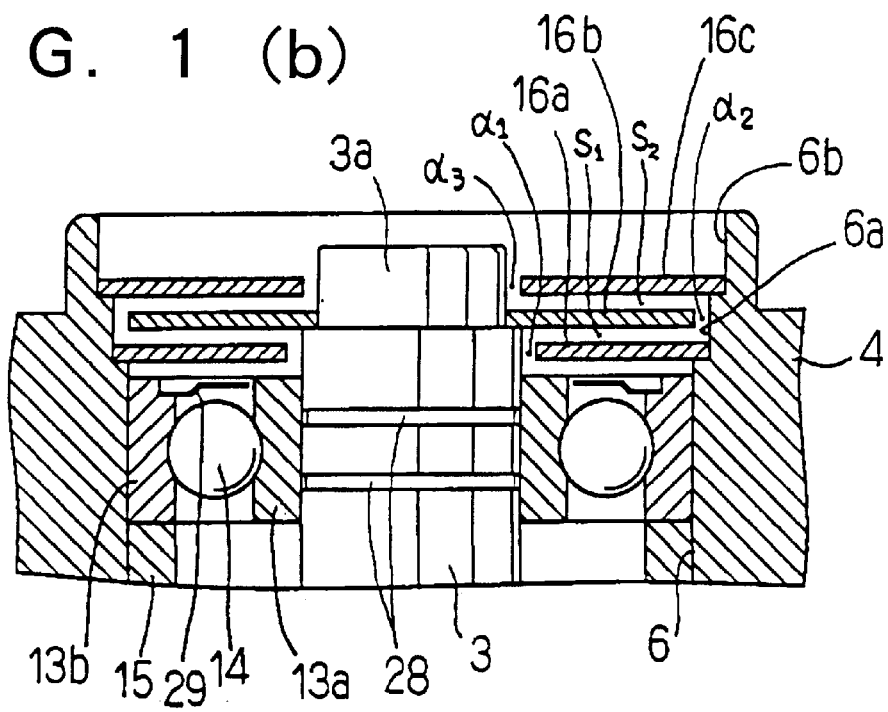

The first embodiment of the present invention will now be described with reference to FIG. 1, wherein reference numeral 1 is attached to a base including a flange 2, reference numeral 3 is attached to a stational spindle secured on the base 1 so as to extend therefrom, and reference numeral 4 is attached to a rotor hub having a magnetic disk supporting portion 5. A vertical bore 6 is provided through the central portion of the rotor hub, so that the spindle 3 extends therethrough.

Reference numeral 7 is attached to stator yorks disposed radially around a boss 8 formed on the central portion of the upper surface of base 1, reference numeral 9 is attached to a stator coil wound around each stator york, and reference numeral 10 is attached to rotor magnet or magnets secured on an inner peripheral surface of a rotor york 12 provided on an inner peripheral surface of a skirt 11 depending from the lower end of the rotor hub 4. There are close tolerance between the outer peripheral surfaces of stator yorks 7 and the inner peripheral surfaces of the magnet or magnets.

A pair of ball bearings comprising inner and outer races 13a and 13b and balls interposed therebetween are installed between central bore 6 of rotor hub 4 and stational spindle 3. The bearings are spaced apart by means of a cylindrical spacer 15 interposed therebetween.

In the motor of this embodiment, rotor hub 4 rotates around stational spindle 3 when energized.

The motor in accordance with the first embodiment of the invention includes a labyrinth seal including a plurality of toroidal sealing plates between the upper end portion of spindle 3 and the upper portion of vertical bore 6 of rotor hub 4. The structure of the labyrinth seal will be described hereinbelow in detail.

The spindle 3 includes a reduced diameter portion 3a on its upper end, and the bore 6 of the rotor hub includes larger diameter portions 6a and 6b in two-stepped manner. Three sealing plates are disposed to form the labyrinth seal.

The first sealing plate 16a is secured at its outer periphery on a shoulder provided by the first larger diameter portion 6a of the vertical bore of the rotor hub so as to leave a slight radial gap $\alpha_1$ between the inner surface of the first sealing plate and the outer surface of the upper and larger diameter portion of the spindle to avoid contacting of the sealing plate and the spindle.

The second sealing plate 16b is secured at its inner periphery on a shoulder provided by the reduced diameter portion 3a of the spindle so as to leave a slight radial gap $\alpha_2$ between the outer surface of the second toroidal sealing plate and the inner surface of the first larger diameter portion 6a of the vertical bore of the rotor hub to avoid contacting of the sealing plate and the bore.

Further, the third sealing plate 16c is secured at its outer periphery on a shoulder provided by the second larger diameter portion 6b of the bore of the rotor hub so as to leave a slight radial gap $\alpha_3$ between the inner surface of the third sealing plate and the outer surface of the reduced diameter portion 3a of the spindle to avoid contacting of the sealing plate and the spindle. There are also axial gaps $s_1$, and $s_2$ between the sealing plates to avoid these plates from contacting with each other. A labyrinth is thus formed by these radial and axial gaps.

Each sealing plate is adapted to be secured to either of the spindle or the bore of the rotor hub by means of the press fitting or adhesive.

Reference numeral 28 is attached to recesses provided around the outer peripheral surface of the spindle. The inner race of each bearing can be secured to the spindle by means of adhesive applied to the recesses.

Reference numeral 29 is attached to a shield plate attached at its outer periphery to the outer race of each bearing. The inner periphery of the shield plate does not contact with the inner race of each bearing.

In the motor of this embodiment, the unsecured end of each sealing plate does not contact with the spindle or the bore of the rotor hub as mentioned above. In this connection, no frictional torque will be produced between elements. Further, no particles will be produced by friction between elements of motor. The labyrinth provided by the sealing plates, the spindle, and the bore of the rotor hub will prevent the mist of the grease applied on the ball bearings from flowing thereout.

<The Second Embodiment of the Invention>

Figure 2:
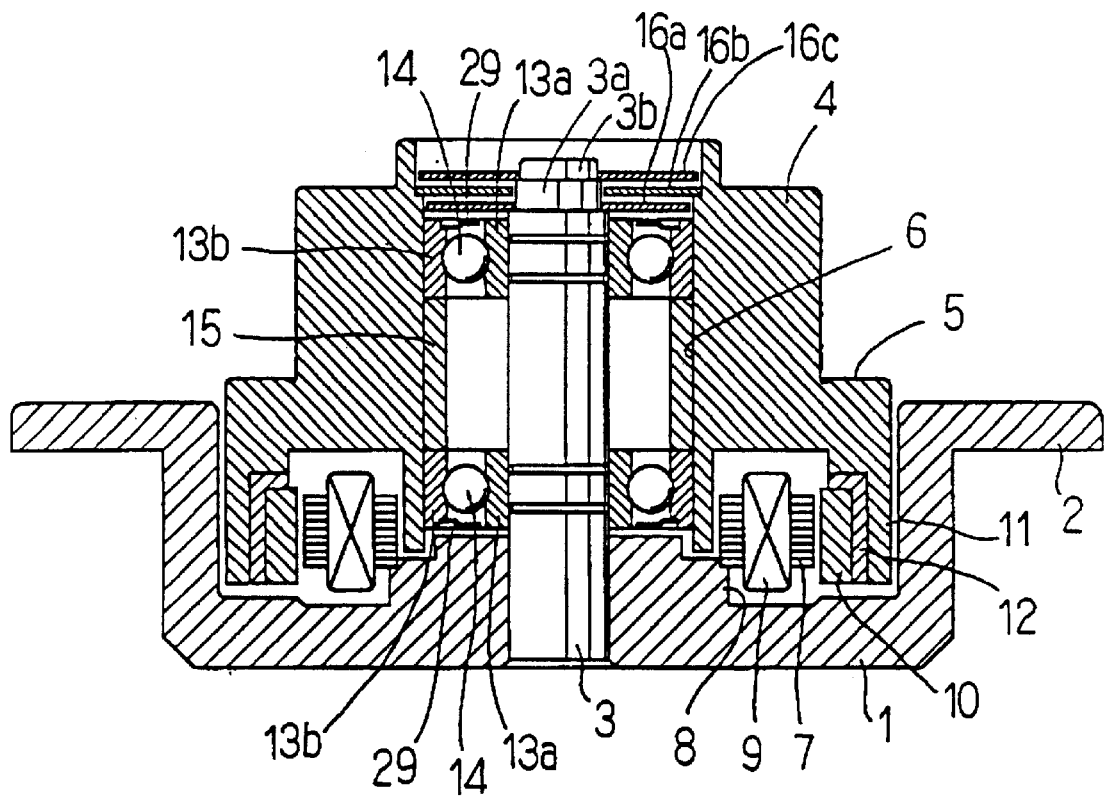
FIG. 2 is an enlarged sectional view showing a motor of the second embodiment of the present invention, in which (a) illustrates a longitudinal sectional view, and (b) illustrates a further enlarged sectional view of the important portion of the motor.
Figure 2:
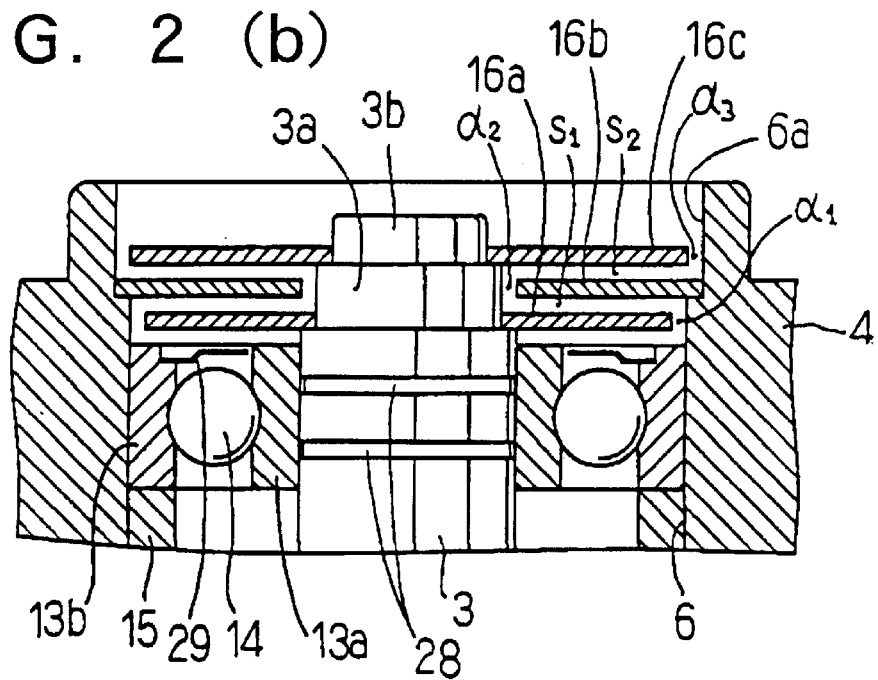

The second embodiment of the present invention will now be described with reference to FIG. 2. The motor of the second embodiment is substantially the same in its rotational mechanism as that of the first embodiment. However, the structure of the labyrinth seal of the motor of the second embodiment is essentially different from that described above with respect to the first embodiment of the invention.

The labyrinth seal of the motor of the second embodiment is formed of a spindle 3 having at its top end two-stepped reduced diameter portions 3a and 3b, a vertical bore 6 of a rotor hub having at its upper end a larger diameter portion 6a, and three sealing plates.

The first sealing plate 16a is secured at its inner periphery to the first reduced diameter portion 3a of the spindle. There are a slight radial gap $\alpha_1$ between the outer periphery of the first sealing plate and the inner surface of the bore 6 so that these elements are remained uncontacted.

The second sealing plate 16b is secured at its outer periphery to the larger diameter portion 6a of vertical bore 6 of the rotor hub. There are a slight radial gap $\alpha_2$ between the inner periphery of the second sealing plate and the outer surface of the first reduced diameter portion 3a of the spindle so that these elements are remained uncontacted.

The third sealing plate 16c is secured at its inner periphery to the second reduced diameter portion 3b of the spindle. There are a slight radial gap $\alpha_3$ between the outer periphery of the first sealing plate and the inner peripheral surface of the second larger diameter portion 6b of the vertical bore of the rotor hub so that these elements are remained uncontacted. There are axial gaps $s_1$ and $s_2$ between the sealing plates to avoid these plates from contacting with each other. A labyrinth is formed by these radial and axial gaps.

<The Third Embodiment of the Invention>

Figure 3:
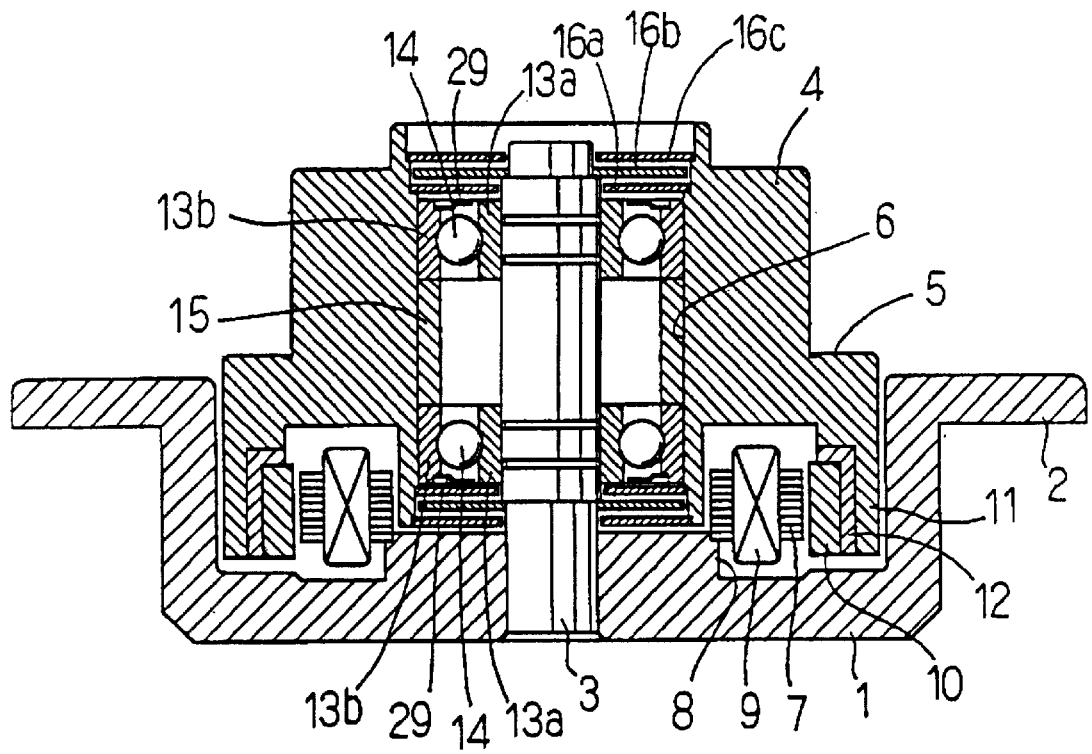
FIG. 3 is an enlarged sectional view showing a motor of the third embodiment of the present invention, in which (a) illustrates a longitudinal sectional view, and (b) illustrates a further enlarged sectional view of the important portion of the motor.
Figure 3:
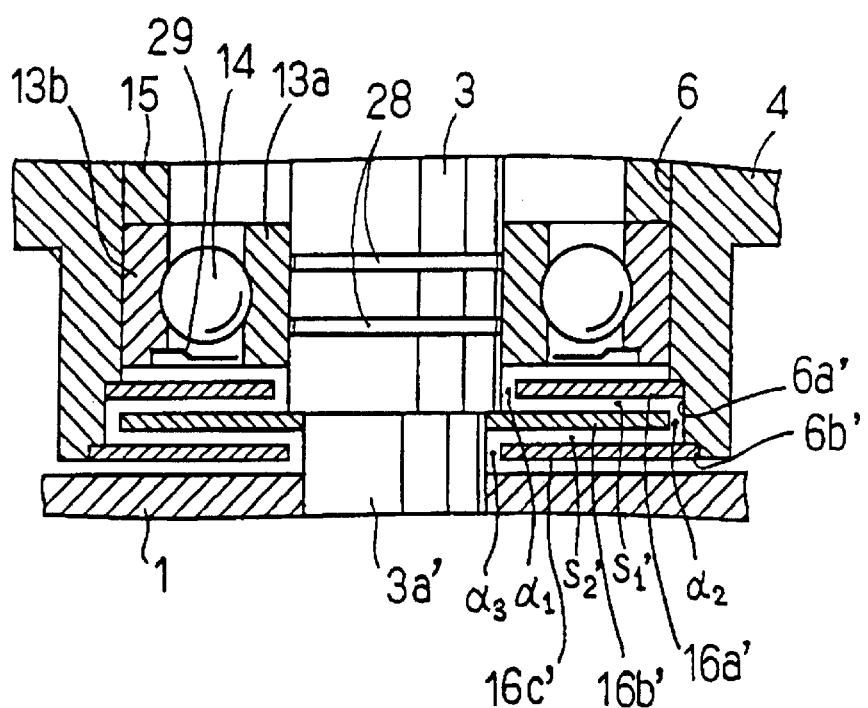

The third embodiment of the present invention will now be described with reference to FIG. 3. In the motor of the third embodiment, an additional labyrinth seal is provided by a plurality of sealing plates between the lower end portion of the spindle 3 and the lower part of vertical bore 6 of rotor hub 4. The remaining structure of the motor of this embodiment is substantially the same as that of the first embodiment.

The additional labyrinth seal of the motor of the third embodiment is formed of a spindle 3 having at its bottom end a reduced diameter portions 3a', the vertical bore 6 of a rotor hub having at its lower end a larger diameter portions 6a' and 6b' in two-stepped manner and three sealing plates.

The first sealing plate 16a' is secured at its outer periphery to the first larger diameter portion 6a' of vertical bore 6 of the rotor hub. There are a slight radial gap $\alpha_1$ between the inner periphery of the first sealing plate and the outer surface of the spindle so that these elements are remained uncontacted.

The second sealing plate 16b' is secured at its inner periphery to the reduced diameter portion 3a' of the spindle. There are a slight radial gap $\alpha_2$ between the outer periphery of the second sealing plate and the inner peripheral surface of the first larger diameter portion 6a' of the vertical bore of the rotor hub so that these elements are remained uncontacted.

The third sealing plate 16c' is secured at its outer periphery to the second larger diameter portion 6b' of vertical bore of the rotor hub. There are a slight radial gap $\alpha_3$ between the inner periphery of the third sealing plate and the outer peripheral surface of the reduced diameter portion 3a' of the spindle so that these elements are remained uncontacted. There are axial gaps $s_1$, and $s_2$ between the sealing plates to avoid these plates from contacting with each other. A labyrinth is formed by these radial and axial gaps.

<The Fourth Embodiment of the Invention>

Figure 4:
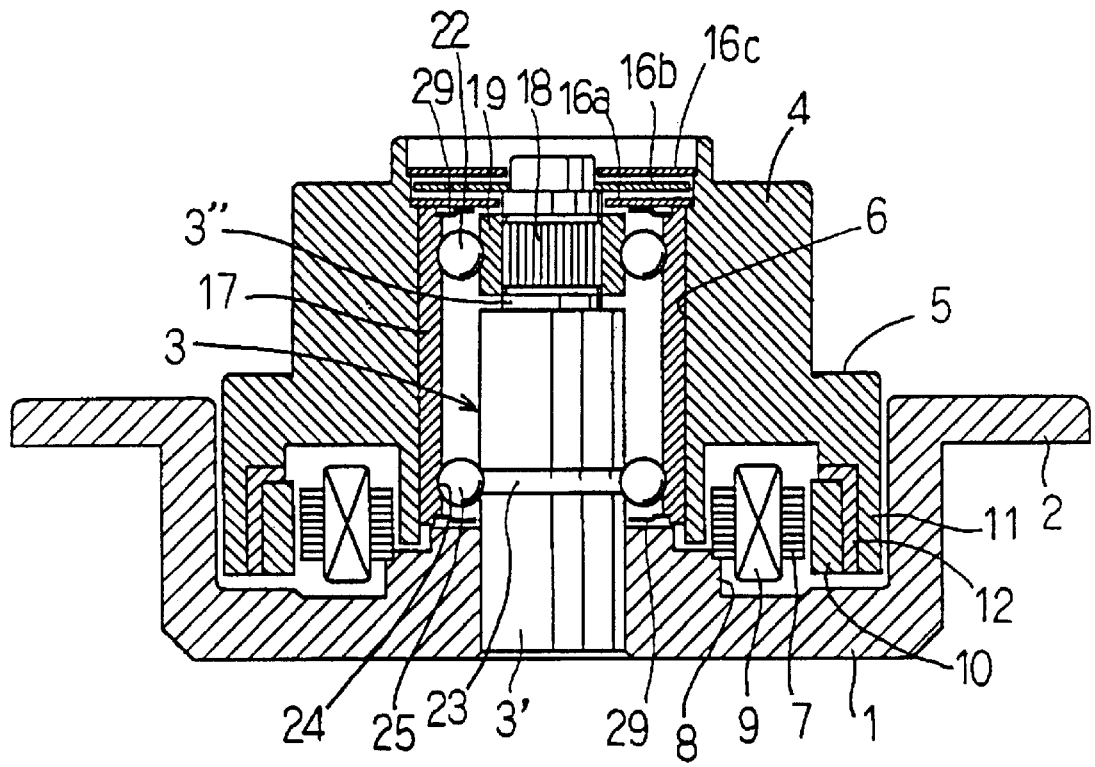
FIG. 4 is an enlarged sectional view showing a motor of the fourth embodiment of the present invention, in which (a) illustrates a longitudinal sectional view, and (b) illustrates a further enlarged sectional view of the important portion of the motor.
Figure 4:
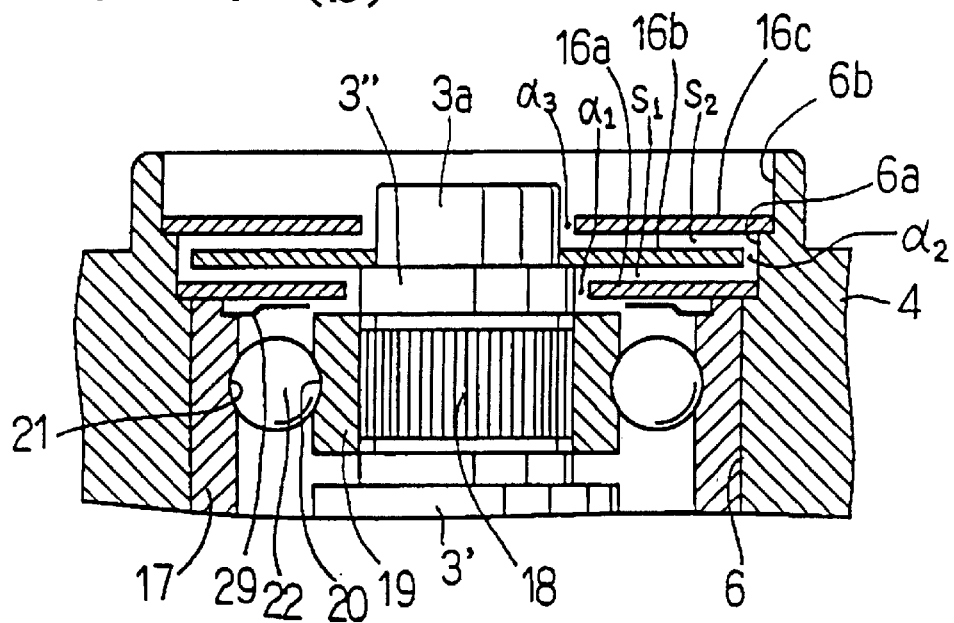

The embodiment illustrated in FIG. 4 employs a bearing assembly of the special structure developed by the applicant.

The bearing assembly does not employ ball bearings of the prior art structure. The bearing assembly includes an outer race provided by a cylindrical sleeve 17.

The spindle is formed as a stepped shaft including a larger diameter shaft portion 3' and a reduced diameter shaft portion 3" formed at the upper portion thereof. The outer surface of the reduced diameter shaft portion 3" is provided with a knurled portion 18, and an inner race 19 is fitted on the knurled portion and fixed thereto by means of adhesive.

Balls 22 are interposed between an outer peripheral rolling contact groove 20 of the inner race 19 and an inner peripheral rolling contact groove 21 of the sleeve 17.

In addition, balls 25 are interposed between an outer peripheral rolling contact groove 23 formed around the larger diameter shaft portion 3' of the spindle and a corresponding inner peripheral rolling contact groove 24 formed on the inner peripheral surface of the sleeve.

The bearing assembly is adapted to be mounted to the rotor hub in such a manner that the sleeve 17 thereof is fitted into the vertical bore 6 of the rotor hub 4 and secured thereto.

In the fourth embodiment of the present invention, provided between the upper portion of the spindle 3 and the upper portion of the vertical bore 6 of the rotor hub 4 is a labyrinth seal of the same structure as that described with reference to the first embodiment i.e. that formed of a plurality of toroidal sealing plates.

In other words, the fourth embodiment of the present invention includes a reduced diameter portion 3a formed additionally on the upper end of the reduced diameter shaft portion 3" of the spindle 3, two-stepped larger diameter portions 6a and 6b formed on the inner periphery of the vertical bore 6 of the rotor hub, and three sealing plates. The first sealing plate 16a is secured at its outer periphery to the first larger diameter portion 6a of the vertical bore of the rotor hub. There are a slight radial gap $\alpha_1$ between the inner periphery of the first sealing plate and the outer peripheral surface of the reduced diameter shaft portion 3" of the spindle so that these elements are remained uncontacted.

The second sealing plate 16b is secured at its inner periphery to the reduced diameter portion 3a of the spindle. There are a slight radial gap $\alpha_2$ between the outer periphery of the second sealing plate and the inner peripheral surface of the first larger diameter portion of the vertical bore of the rotor hub so that these elements are remained uncontacted.

The third sealing plate 16c is secured at its outer periphery to the second larger diameter portion 6b of the vertical bore of the rotor hub. There are a slight radial gap $\alpha_3$ between the inner periphery of the third sealing plate and the outer peripheral surface of the reduced diameter portion 3a of the spindle so that these elements are remained uncontacted. There are slight axial gaps $s_1$ and $s_2$ between the sealing plates to avoid these plates from contacting with each other. A labyrinth is formed by these radial and axial gaps.

A pair of shield plates are attached at their outer periphery to both upper and lower end of the sleeve. The inner periphery of each shield plate does not contact with the surface of the spindle.

<The Fifth Embodiment of the Invention>

Figure 5:
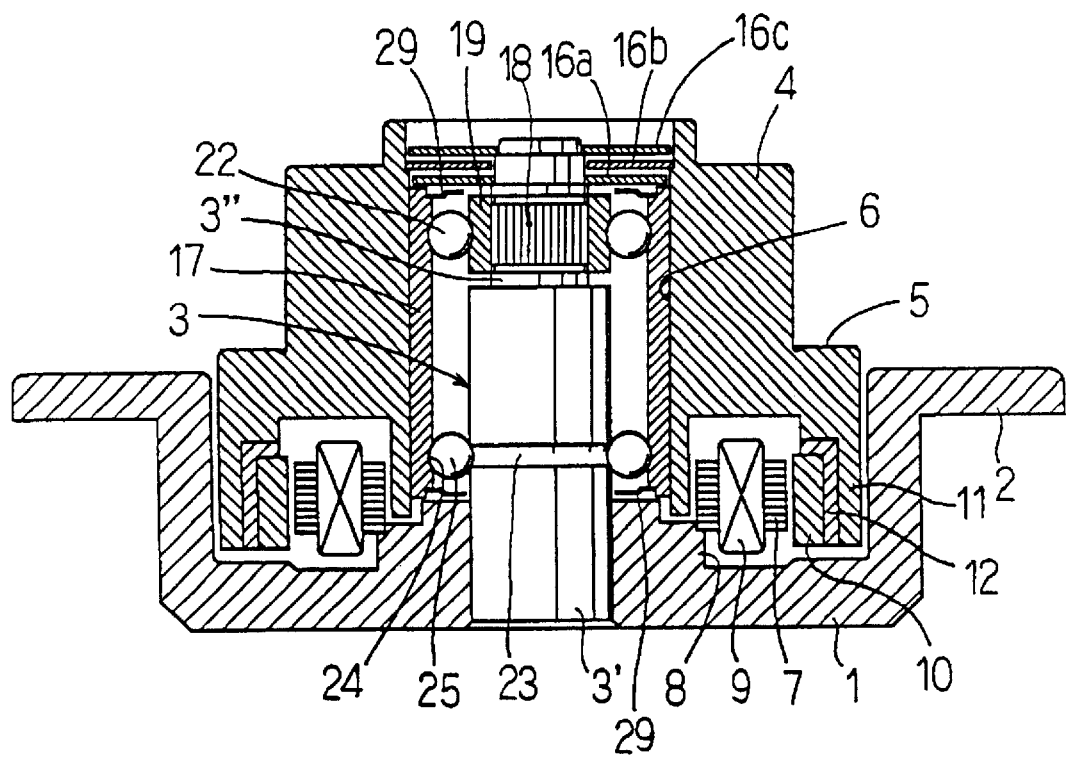
FIG. 5 is an enlarged sectional view showing a motor of the fifth embodiment of the present invention, in which (a) illustrates a longitudinal sectional view, and (b) illustrates a further enlarged sectional view of the important portion of the motor.
Figure 5:
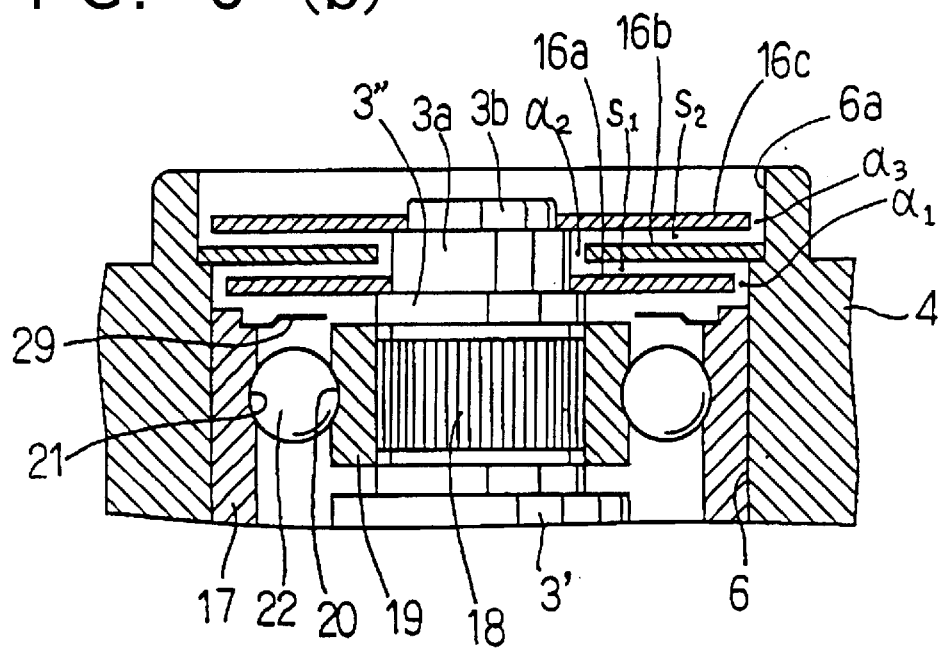

Although the embodiment illustrated in FIG. 5 is same in its bearing assembly and the mechanism of the rotational parts as those of the fourth embodiment, the structure of the labyrinth thereof is different from that of the fourth embodiment.

In other words, the upper end portion of the reduced diameter shaft portion 3" of the spindle 3 is formed as a two-step structure including first and second reduced diameter portions 3a and 3b. The upper end portion of the vertical bore 6 of the rotor hub is countersunk to provide a larger diameter portion 6a. Three sealing plates are used.

The first sealing plate 16a is secured at its inner periphery to the first reduced diameter portion 3a of the spindle. There are a slight radial gap $\alpha_1$ between the outer periphery of the sealing plate and the inner peripheral surface of the vertical bore 6 of the rotor hub so that these elements are remained uncontacted.

The second sealing plate 16b is secured at its outer periphery to the larger diameter portion 6a of the vertical bore of the rotor hub. There are a slight radial gap $\alpha_2$ between the inner periphery of the sealing plate and the first reduced diameter portion 3a of the spindle so that these elements are remained uncontacted.

The third sealing plate 16c is secured at its inner periphery to the second reduced diameter portion 3b of the spindle. There are a slight radial gap $\alpha_3$ between the outer periphery of the sealing plate and the inner peripheral surface of the second larger diameter portion 6a of the vertical bore of the rotor hub so that these elements are remained uncontacted.

There are slight axial gaps $s_1$, and $s_2$ between the sealing plates. A labyrinth is formed by these radial and axial gaps.

<The Sixth Embodiment of the Invention>

Figure 6:
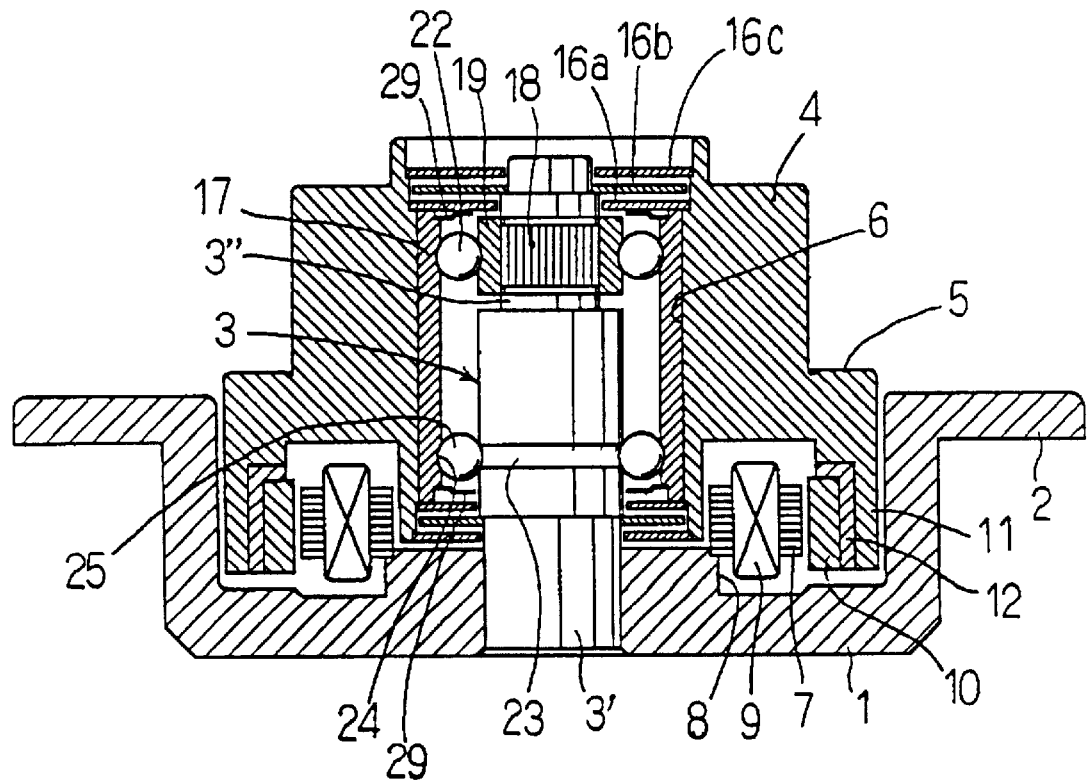
FIG. 6 is an enlarged sectional view showing a motor of the sixth embodiment of the present invention, in which (a) illustrates a longitudinal sectional view, and (b) illustrates a further enlarged sectional view of the important portion of the motor.
Figure 6:
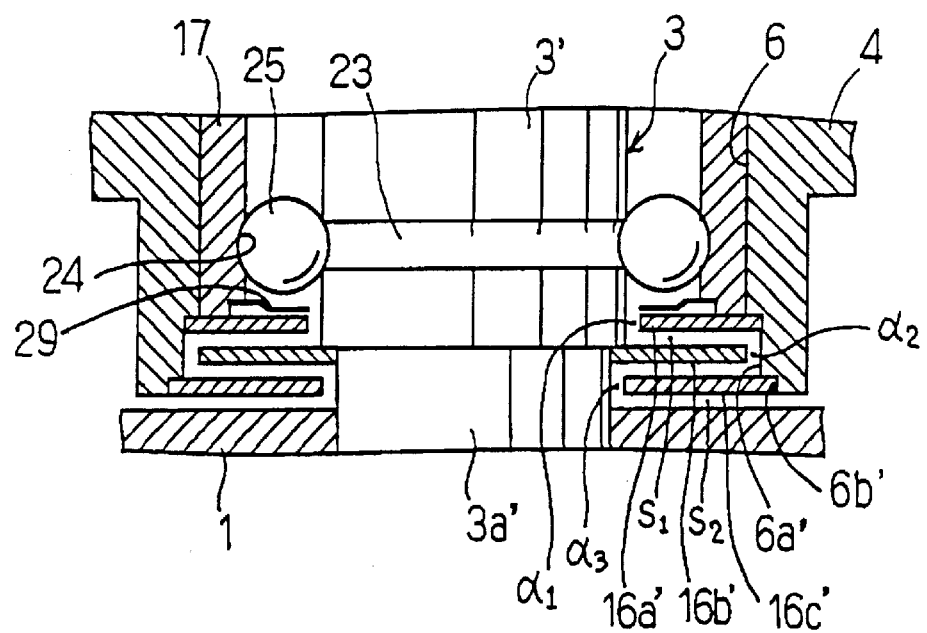

The embodiment illustrated in FIG. 6 is the sixth embodiment of the invention in which an additional labyrinth seal formed of a plurality of toroidal sealing plates is provided between the lower end portion of the spindle 3 and the lower portion of vertical bore 6 of the rotor hub 4. The sixth embodiment is substantially the same in other respects as those of the fourth embodiment.

In the structure of this embodiment, the spindle 3 includes at its lower end a reduced diameter portion 3a', the lower end portion of the bore 6 of the rotor hub includes tow-stepped larger diameter portions 6a' and 6b', and three sealing plates are used.

The first sealing plate 16a' is secured at its outer periphery to the first larger diameter portion 6a' of the vertical bore of the rotor hub. There are a slight radial gap $\alpha_1$ between the inner periphery of the first sealing plate and the outer peripheral surface of the spindle so that these elements are remained uncontacted.

The second sealing plate 16b' is secured at its inner periphery to the reduced diameter portion 3a' of the spindle. There are a slight radial gap $\alpha_2$ between the outer periphery of the second sealing plate and the inner peripheral surface of the first larger diameter portion 6a' of the vertical bore of the rotor hub so that these elements are remained uncontacted.

The third sealing plate 16c' is secured at its outer periphery to the second larger diameter portion 6b' of the vertical bore of the rotor hub. There are a slight radial gap $\alpha_3$ between the inner periphery of the third sealing plate and the outer peripheral surface of the reduced diameter portion 3a' of the spindle so that these elements are remained uncontacted. There are axial gaps $s_1$ and $S_2$ between the sealing plates. A labyrinth is formed by these radial and axial gaps.

<The Seventh Embodiment of the Invention>

Figure 7:
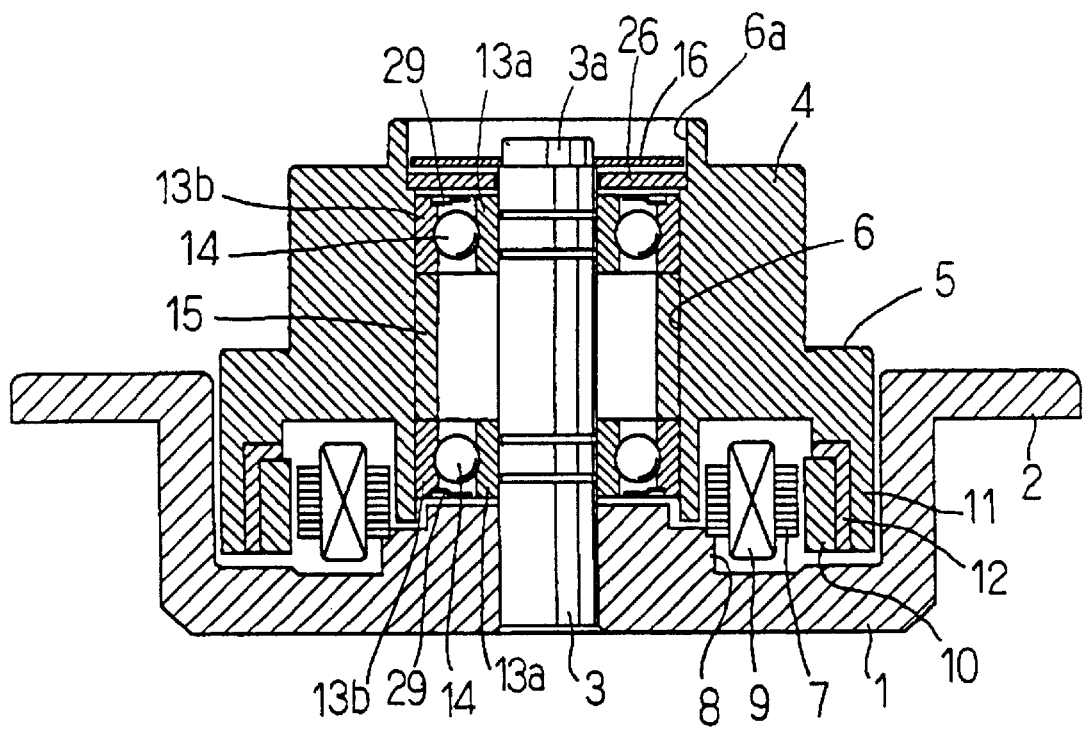
FIG. 7 is an enlarged sectional view showing a motor of the seventh embodiment of the present invention, in which (a) illustrates a longitudinal sectional view, and (b) illustrates a further enlarged sectional view of the important portion of the motor.
Figure 7:
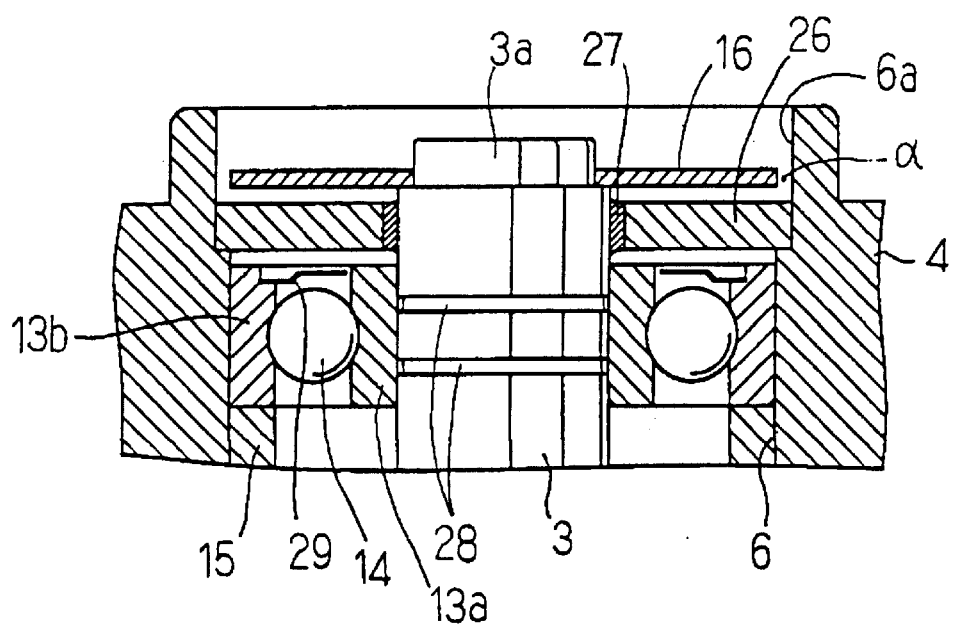

The, seventh embodiment of the invention wherein a labyrinth seal and a magnetic fluid sealing means are incorporated is illustrated in FIG. 7. The structure of the seventh embodiment is substantially the same in other respects as those of the first embodiment.

In this embodiment, a toroidal magnetic fluid bearing plate 26 made of magnet is secured in its outer peripheral edge to the larger diameter portion 6a provided on the upper portion of vertical bore 6 of the rotor hub. There are a slight radial gap between the inner periphery of the bearing plate and the outer peripheral surface of the spindle so that these elements are remained uncontacted. The radial gap is adapted to be filled with magnetic fluid 17 under the effect of the magnetic force provided by the magnetic fluid bearing plate.

A toroidal sealing plate 16 is fitted at its inner peripheral edge onto the outer periphery of reduced diameter portion 3a formed on the upper end of the spindle. There are a slight radial gap $\alpha$ between the outer periphery of the sealing plate and the inner peripheral surface of vertical bore 6 of the rotor hub so that these elements are remained uncontacted.

As can be seen from above, a sufficient sealing effect is obtained by means of a dual sealing means including the labyrinth seal and the magnetic fluid sealing means provided between the upper portion of the spindle and the upper part of the bore of the rotor hub.

<The Eighth Embodiment of the Invention>

Figure 8:
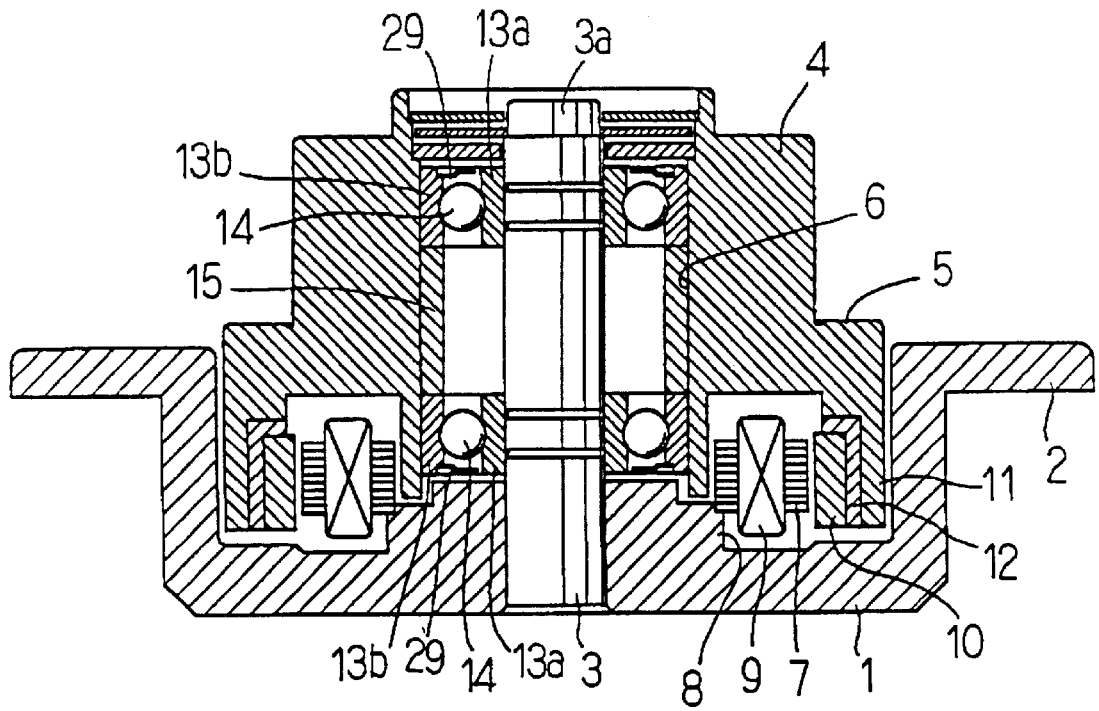
FIG. 8 is an enlarged sectional view showing a motor of the eighth embodiment of the present invention, in which (a)
Figure 8:
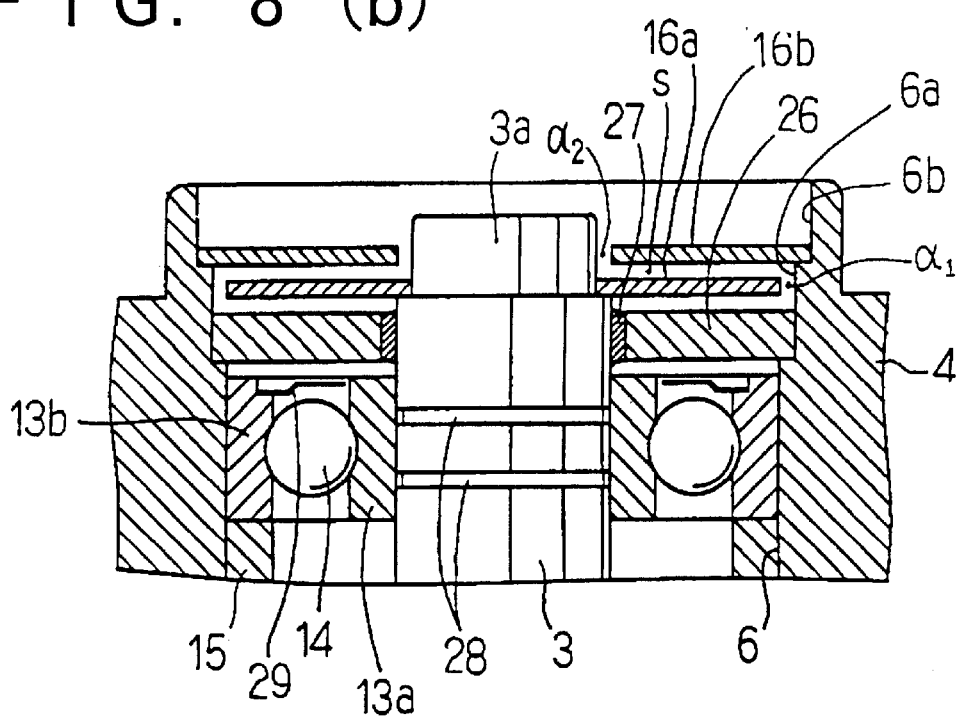

The eighth embodiment of the invention wherein a labyrinth seal including a pair of sealing plates and a magnetic fluid sealing means are incorporated is illustrated in FIG. 8. The structure of the eighth embodiment is substantially the same in other respects as those of the seventh embodiment.

In this embodiment, a toroidal magnetic fluid bearing plate 26 made of magnet is secured in its outer peripheral edge to the first larger diameter portion 6a provided on vertical bore 6 of the rotor hub. There are a slight radial gap between the inner periphery of the bearing plate and the upper outer peripheral surface of the spindle 3 so that these elements are remained uncontacted. The radial gap is adapted to be filled with magnetic fluid 27 under the effect of the magnetic force provided by the magnetic fluid bearing plate.

A toroidal first sealing plate 16a is fitted at its inner peripheral edge onto the outer periphery of reduced diameter portion 3a of the spindle. There are a slight radial gap $\alpha_1$ between the outer periphery of the sealing plate and the inner peripheral surface of first larger diameter portion 6a of vertical bore 6 of the rotor hub so that these elements are remained uncontacted.

The second sealing plate 16b is secured at its outer periphery to the second larger diameter portion 6b of vertical bore 6 of the rotor hub. There are a slight radial gap $\alpha_2$ between the inner periphery of the sealing plate and the reduced diameter portion 3a provided on the upper end of the spindle so that these elements are remained uncontacted. The first and second sealing plates are spaced axially slightly by axial gap s.

In the motor of this embodiment, the space defined between the upper portion of the spindle and the upper portion of the bore of the rotor hub is adapted to be sealed by means of the labyrinth seal including a pair of sealing plates, so that the sealing effect to be obtained by this embodiment is better than that of the seventh embodiment.

In accordance with the present invention the outflowing of grease or particles of grease applied to the bearing can be prevented by means of a labyrinth seal including radial and axial gaps formed by a plurality of sealing plates disposed between the spindle and the vertical bore of the rotor hub.

There are no contact between the unsecured end (i.e. the inner or outer periphery) of the sealing plates and the surface of the spindle or the bore opposite thereto. In this connection, the sealing plate or plates will provide following advantages.

(a) No frictional torque will be generated between the sealing plate and the spindle or the bore of the rotor hub.
(b) Wearing of the sealing plate and producing of particles due to wearing can be prevented, so that the durability and the lifetime of the sealing plate will be increased.
(c) No frictional heat will be produced.
(d) Generation of frictional vibrations can be prevented.
(e) No frictional noise will be produced.
(f) Power loss of the motor due to friction can be avoided.
(g) The energy required for driving the motor can be decreased to be able to save energy.

The toroidal sealing plates can be produced easily, precisely, and economically through such a method as the press-cutting. The sealing plates can be handled easily. The assembling operation of the sealing plates into spindle and/or the rotor hub can be effected easily so that the cost for assembling can be reduced.

The labyrinth seal of the motor of the present invention does not require the recessed pockets as shown in FIG. 9 illustrating the prior art motor. In this connection, the cost for machining and molding parts of the motor can be saved, so that the cost for manufacturing the motor can be reduced.

The frictional heat generated in the bearing apparatus will be dissipated through radial gaps and axial gaps to prevent the motor from overheating.

While particular embodiments of the present invention have been illustrated and described, it should be obvious to those skilled in the art that various changes and modifications can be made without departing from the spirit and scope of the invention.

What is claimed is:

1. A spindle motor including a base, a spindle secured to the base and extending therefrom, the spindle having upper and lower end portions, a rotor hub having a vertical bore through a central portion thereof, the vertical bore having upper and lower end portions, a bearing assembly interposed between the spindle and the bore of the rotor hub, a labyrinth seal formed between the spindle and the rotor hub, and
   a plurality of flat sealing plates disposed between corresponding end portions of the spindle and the vertical bore of the rotor hub, the flat sealing plates spaced axially by small gaps therebetween,
   alternate ones of said flat sealing plates being secured to said vertical bore of the rotor hub and to said spindle, respectively;

said flat sealing plates secured to said vertical bore having an outer peripheral portion secured to said vertical bore and an inner peripheral portion spaced by a slight radial gap from said spindle;

said flat sealing plates secured to said spindle having an inner peripheral portion secured to said spindle and an outer peripheral portion spaced by a slight radial gap from said vertical bore, wherein:

said spindle comprises a stepped structure at an end portion thereof, said end portion having a smaller diameter than another portion of said spindle adjacent thereto and forming a step therebetween; and at least one of said flat sealing plates secured to said spindle is secured thereto at said step.

2. A spindle motor as recited in claim 1 wherein each of said rotor and said spindle comprises at least one shoulder for supporting a flat sealing plate thereon, said shoulder including a transverse radial surface between adjacent circumferential axial surfaces of different radii, each said shoulder of said spindle corresponding to and having a slight axial displacement from a corresponding shoulder of said rotor.

3. A spindle motor as recited in claim 2, wherein at least one of said rotor and said spindle includes a plurality of shoulders, and wherein adjacent ones of said plurality of shoulders have slight axial displacements respectively before and after a same corresponding shoulder of said at least one shoulder of the other of said rotor and said spindle.

4. A spindle motor as recited in claim 2, wherein said rotor includes a two-stepped shoulder configuration having two adjacent shoulders axially displaced from each other and supporting adjacent sealing plates, and wherein a corresponding shoulder of said spindle is axially positioned between said two shoulders of said rotor and supports a sealing plate between said adjacent sealing plates supported by said two adjacent shoulders of said rotor.

5. A spindle motor as recited in claim 2, wherein said spindle includes a two-stepped shoulder configuration having two adjacent shoulders axially displaced from each other and supporting adjacent sealing plates, and wherein a corresponding shoulder of said rotor is axially positioned between said two shoulders of said spindle and supports a sealing plate between said adjacent sealing plates supported by said two adjacent shoulders of said spindle.

6. A spindle motor including a base, a spindle secured to the base and extending therefrom, the spindle having upper and lower end portions, a rotor hub having a vertical bore through a central portion thereof, the vertical bore having upper and lower end portions, a bearing assembly interposed between the spindle and the bore of the rotor hub, a labyrinth seal formed between the spindle and the rotor hub, and a plurality of flat sealing plates disposed between corresponding end portions of the spindle and the vertical bore of the rotor hub, the flat sealing plates spaced axially by small gaps therebetween, alternate ones of said flat sealing plates being secured to said vertical bore of the rotor hub and to said spindle, respectively;

said flat sealing plates secured to said vertical bore having an outer peripheral-portion secured to said vertical bore and an inner peripheral portion spaced by a slight radial gap from said spindle;

said flat sealing plates secured to said spindle having an inner peripheral portion secured to said spindle and an outer peripheral portion spaced by a slight radial gap from said vertical bore, wherein:

an inner surface of said vertical bore comprises a stepped structure at an end portion thereof, said end portion having a larger diameter than another portion of said vertical bore adjacent thereto and forming a first step therebetween;

at least one of said flat sealing plates secured to said vertical bore is secured thereto at said first step;

said spindle comprises a stepped structure at an end portion thereof, said end portion of said spindle having a smaller diameter than another portion of said spindle adjacent thereto and forming a second step therebetween; and at least one of said flat sealing plates secured to said spindle is secured thereto at said second step.

7. A spindle motor including a base, a spindle secured to the base and extending therefrom, the spindle having upper and lower end portions, a rotor hub having a vertical bore through a central portion thereof, the vertical bore having upper and lower end portions, a bearing assembly interposed between the spindle and the bore of the rotor hub, a labyrinth seal formed between the spindle and the rotor hub, and a plurality of flat sealing plates disposed between corresponding end portions of the spindle and the vertical bore of the rotor hub, the flat sealing plates spaced axially by small gaps therebetween, alternate ones of said flat sealing plates being secured to said vertical bore of the rotor hub and to said spindle, respectively;

said flat sealing plates secured to said vertical bore having an outer peripheral portion secured to said vertical bore and an inner peripheral portion spaced by a slight radial gap from said spindle;

said flat sealing plates secured to said spindle having an inner peripheral portion secured to said spindle and an outer peripheral portion spaced by a slight radial gap from said vertical bore, wherein:

an inner surface of said vertical bore comprises a stepped structure at an end portion thereof, said end portion having a larger diameter than another portion of said vertical bore adjacent thereto and forming a first step therebetween;

at least one of said flat sealing plates secured to said vertical bore is secured thereto at said first step;

said spindle comprises a stepped structure at an end portion thereof, said end portion of said spindle having a smaller diameter than another portion of said spindle adjacent thereto and forming a second step therebetween;

at least one of said flat sealing plates secured to said spindle is secured thereto at said second step;

at least one of said vertical bore and said spindle comprises a stepped structure having a plurality of steps at an end portion thereof, and wherein each of a plurality of the flat sealing plates secured to said a t leas t one of said vertical bore and said spindle is secured to a respective one of said plurality of steps formed at said end portion thereof.

\* \* \* \* \*